United States Patent [19]

Kossel

[11] 3,874,800

[45] Apr. 1, 1975

[54] APPARATUS FOR DETECTING LIQUID POLLUTION IN A TRANSPARENT CONTAINER

[75] Inventor: Dierick Kossel, Braunfels, Germany

[73] Assignee: Ernst Leitz GmbH, Wetzlar, Germany

[22] Filed: Nov. 27, 1973

[21] Appl. No.: 419,429

[30] Foreign Application Priority Data

Dec. 12, 1972 Germany ........................... 2260602

[52] U.S. Cl. ............ 356/208, 250/237 G, 356/203, 356/204

[51] Int. Cl. ...................... G01n 21/06, G01n 21/26

[58] Field of Search ........... 356/103, 104, 197, 208; 250/237 G

[56] References Cited

UNITED STATES PATENTS

| | | | |
|---|---|---|---|
| 2,531,529 | 11/1950 | Price | 356/197 |
| 3,198,061 | 8/1965 | Hock | 250/237 G |
| 3,586,665 | 6/1971 | Weyrauch | 250/237 G |

*Primary Examiner*—Saxfield Chatmon, Jr.
*Attorney, Agent, or Firm*—Krafft & Wells

[57] ABSTRACT

An apparatus for detecting pollution of the liquid contained in a container having transparent walls. Means are provided for causing the liquid to move relative to the stationary container. A zone of the liquid is illuminated and imaged on a component including at least one optical grating and at least one photoelectric receiver behind the grating in the direction of light flux; the receiver being responsive to light received from each grating. An electrical evaluation means is connected to the receivers for comparing the electrical signals derived from the respective photoelectric receivers, thereby generating a signal which is indicative of the presence of pollutant particles in the liquid.

10 Claims, 1 Drawing Figure

10
11
1
2
3
4
13
12
7
15
14
servo equipment
6
5
12
8

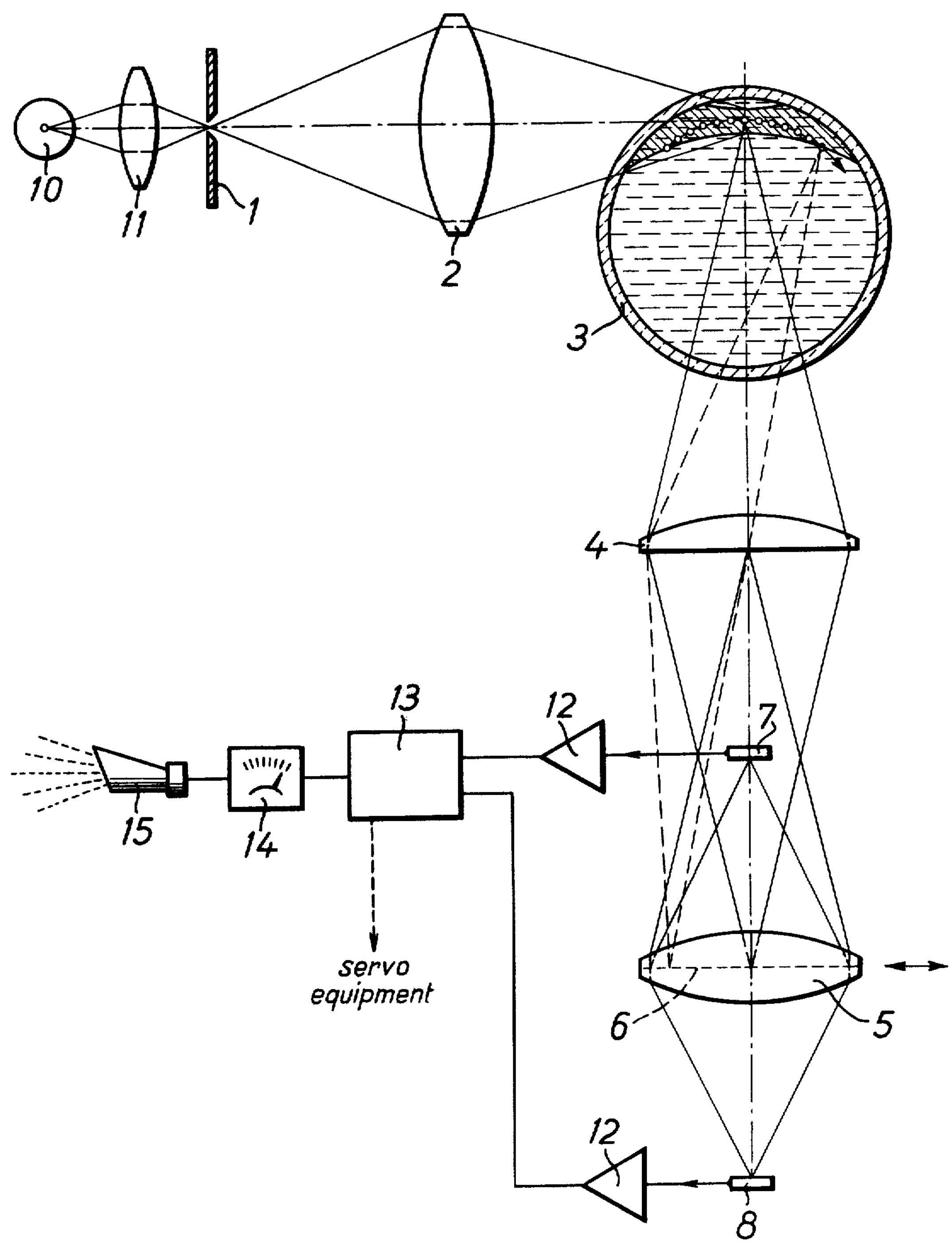
10
11
1
2
3
4
13
12
7
15
14
servo
equipment
6
5
12
8

APPARATUS FOR DETECTING LIQUID POLLUTION IN A TRANSPARENT CONTAINER

BACKGROUND OF THE INVENTION

The present invention relates to an apparatus for detecting the presence of pollutants in clear liquids in a transparent container.

In known apparatus for visually detecting the presence of pollutants, the pollutants of the liquids are separated from the effects generated by unevennesses of the containers—for example scratches, glass striations and labelling—by generating relative motion between such liquid and its container. Such relative motion may be obtained by suddenly arresting rotational motion of an intensively illuminated, filled ampoule rotating about its axis and observing the pollutants in the still rotating liquid which act as light scattering centres. In this way the pollutants are clearly differentiated from the unmoved inhomogeneities of the stationary ampoule. A disadvantage of such apparatus is that an observer is required and the results do not lend themselves to quantitative assessment.

SUMMARY OF THE INVENTION

According to the present invention this disadvantage is overcome by an apparatus for detecting the presence of pollutant particles in transparent or translucent liquid in a container provided with at least one transparent or translucent wall portion, the apparatus comprising means for illuminating a zone in liquid contained in such a container, optical means for imaging the illuminated zone on to a component provided with at least one optical grating, at least one photoelectric receiver responsive to light received from the or each grating, and means for deriving electrical signals from the or each receiver indicative of the presence of pollutant particles in the liquid.

The or each photoelectric receiver can additionally be followed in the circuit by a signal amplitude discriminator. In further development, the correlator system may include at least one grating orientated in two measuring co-ordinate directions including between them an angle unequal to 180° as well as means generating a mechanical motion of this grating or it may include optical components, which are polarising light or splitting light into different colour components, for the generation of direction defining signals in at least one coordinate direction. To advantage, the correlator system can also comprise optical components generating antiphase signals.

BRIEF DESCRIPTION OF THE DRAWING

The invention will be more readily comprehended from the following description when taken in conjunction with the appending drawing which shows schematically the path of light rays from a light source to an ampoule and to signal evaluation elements and circuits.

DESCRIPTION OF THE PREFERRED EMBODIMENT

From a slit shaped pupil in a scrren 1, illuminated by means of a lamp 10 through a condenser 11, there emanates a bundle of illuminating rays. This bundle of rays is so transmitted through a lens 2—and in a given case through a transparent optical adapting body (adapting immersion or the like)—into a liquid filled cylindrical ampoule 3 that a region of the liquid in the ampoule is irradiated by light from the lamp 10, the dimensions of the irradiated region are determined by the depth of focus and size of field of the imaging lens 2. The ampoule 3 is shown in cross-section, the section extending perpendicularly to the longitudinal axis of the ampoule. The irradiated region is imaged by a lens 4 to form an image in a plane which is co-incident with the principal plane of a two-component split field lens 5. In this principal plane, an optical grating 6 is arranged to form a grating of an optical correlator system. The grating 6 is provided with a plurality of mutually parallel strips of opaque reflective material, which are interposed with transparent gaps. The strips and gaps of the grating 6 are so orientated that they extend parallel to the longitudinal axis of the ampoule 3. The field lens 5 produces, for each of the reflected and the transmitted bundle of rays, a respective reduced image of the pupil. Such images are disposed in front and to the rear of the grating 6, and are located on the optical axis of the lens 5. In each of the planes of these images, respective photoelectric receivers 7 and 8 are located. The receiver 7 simultaneously masks part of the image field near to the axis of the light scattered by the pollutants.

On the filled ampoule 3 being rotated about its longitudinal axis, scatter particles in the liquid traverse the irradiated region of the ampoule 3 and, due to the momentum of the moving liquid in the ampoule 3 such particles continue to circulate for a considerable period after the rotation of the ampoule 3 about its longitudinal axis has been arrested. Such moving scatter particles are imaged by the lens 4 in the plane of the grating 6. The grating 6 splits the light emanating from the moving scatter particles into two geometrically separate ray bundles. The two bundles of rays are modulated in anti-phase with respect to each other in their light intensity. Each ray bundle generates corresponding electrical output signals at the receivers 7 and 8, respectively. The grating constant of the grating 6 (which constant is determined by the width of the reflective and transparent strips) is preferably so selected along the grating division that scatter particles moving around in the ampoule withc constant angular velocity in each path element deliver anti-phase signals of fixed frequency. The amplitude of the electrical signals arising at the two receivers 7 and 8 is a measure of the size and number of the scatter particles present. These signals are—after traversing an amplifier 12 and a comparison stage 13—applied to an indicating device or a warning device and/or to servo equipment (not shown).

The apparatus which has been described above may alternatively be arranged to provide an extended illuminating ray path. In such an alternative arrangement, the screen 1 is so disposed that the illuminated slit defined thereby is located on the optical axis of the lens 4 and the field lens 5. In such arrangement the receiver 7 acts simultaneously as a mask producing a dark field zone.

It is important to differentiate between genuine pollutants and air or gas bubbles in the liquid. For this purpose, the correlator measuring head is so constructed as a two-co-ordinate sensor with a corresponding raster and receiver system, that on a movement of the scatter particles along the longitudinal axis of the ampoule corresponding further electrical signals are obtained. These further signals being indicative of the direction of movement of such particles. Suitable for this purpose is an optical correlator system with a pyramid raster and two pairs of photoelectric receivers arranged downstream. For the purpose of obtaining signals characteristic of the direction of particle movement parallel to the axis of the ampoule, the raster and the ampoule are arranged to be relatively oscillatorily displaced along a path extending parallel to the longitudinal axis of the ampoule. Electrical signals derived as a result of air bubbles rising up in the liquid are clearly identifiable with such apparatus, and hence may be used to differentiate between signals derived as a result of the movement of pollutant scatter particles and those derived as a result of the axial movement of air or gas bubbles in the liquid under test.

In the case of a container—such as a beaker, ampoule or flask—with a transparent bottom wall which is optically not too inhomogeneous, the presence of sediment pollutants may be detected by means of an arrangement having its optical axis extending parallel to the longitudinal axis of such a container. In these circumstances, the liquid zone immediately above the bottom wall of the container is imaged—under perpendicular or slanting illumination—in the central dark field on the grating of a correlator system. In such arrangement the grating is a radial optical grating. Anti-phase signals are again derived from photoelectric receivers arranged on the optical axis in front and behind the grating.

In this variant, which in principle represents a correlation optical tachometer, the movement of pollutant scatter particles in the liquid provide signals which are derived either just after the start of ampoule rotation on the radial grating disc rotating therewith, or just after the arrest of the ampoule rotation on the radial grating disc being stationary.

For the measurement in the case of relatively viscous liquids, it can be of advantage to set the container and the grating of the correlator system into oscillating movements in such a manner, that the image of the container is stationary relative to the grating, that is to say no relative movement takes place between container and grating. Such an equipment can be realized particularly easily then, when the container is observed for example from the bottom surface, that is to say from a surface disposed perpendicularly to the rotational aixs. In this case, the grating of the correlator system must be moved synchronously in displacement with the container bottom, which lets itself be easily attained with a single drive means. Due to the oscillating movement, a relative movement of longer duration takes place between container and the liquid, whereby unobjectionable measurement results are to be attained even with viscous liquids.

What is claimed is:

1. Apparatus for detecting the presence of pollutant particles in transparent or translucent liquid in a container provided with at least one transparent or translucent wall portion, the apparatus comprising:

a. means for causing the liquid to move relative to the stationary container;

b. means for illuminating a zone in the liquid contained in the container;

c. optical grating means whereon said illuminated zone is imaged;

d. optical lens means for refracting the imaging light rays from said illuminated zone to said optical grating means;

e. photoelectric receiver means responsive to light received from said grating means; and f. means for deriving electrical signals from the photoelectric receiver, said signals being indicative of the presence of pollutent particles in the liquid.

2. Apparatus as claimed in claim 1, and further comprising a split field lens defining a component having said optical grating means therein for imaging light from said optical grating means on said photoelectric receiver means.

3. Apparatus as claimed in claim 2, wherein said means for deriving the electrical signal from the photoelectric receiver comprises amplitude discriminator means.

4. Apparatus as claimed in claim 2, wherein said optical grating means comprises at least one optical grating disposed in two co-ordinate directions including an angle therebetween unequal to 180°, and further comprising displacement means for displacing said optical grating means to generate electrical signals responsive to the direction of movement of pollutant particles in at least one of said co-ordinate directions.

5. Apparatus as claimed in claim 2, and further comprising optical means for polarising light into different light components for the generation of direction defining signals in at least one co-ordinate direction.

6. Apparatus as claimed in claim 2, and further comprising optical means for splitting light into different color components for the generation of direction defining signals in at least one co-ordinate direction.

7. Apparatus as claimed in claim 2, wherein said photoelectric receiver means comprise at least one pair of photoelectric receivers co-ordinated with said grating means, one of the receivers of the pair being responsive to light transmitted through the respective grating means and the other of the receivers being responsive to light reflected from the respective grating means.

8. Apparatus as claimed in claim 7, wherein said means for deriving the electrical signals comprises means for comparing the electrical signals derived from the respective photoelectric receivers of the pair.

9. Apparatus as claimed in claim 8, wherein said grating means is so constructed and arranged that the electrical signals derived from the respective receivers of the pair are in phase opposition to one another.

10. Apparatus as claimed in claim 2, and further comprising means to impart oscillatory motion to the container and the component provided with at least one optical grating, the arrangement being such that the container and the grating are each displaced without relative motion therebetween.

* * * * *